US012325261B1

(12) United States Patent
Dancy

(10) Patent No.: US 12,325,261 B1
(45) Date of Patent: Jun. 10, 2025

(54) SECTIONABLE PAINTER'S CUP

(71) Applicant: Lynnette Dancy, Chicago, IL (US)

(72) Inventor: Lynnette Dancy, Chicago, IL (US)

( * ) Notice: Subject to any disclaimer, the term of this patent is extended or adjusted under 35 U.S.C. 154(b) by 0 days.

(21) Appl. No.: 18/925,355

(22) Filed: Oct. 24, 2024

Related U.S. Application Data

(60) Provisional application No. 63/626,628, filed on Jan. 30, 2024.

(51) Int. Cl.
*B44D 3/22* (2006.01)
*B05C 21/00* (2006.01)

(52) U.S. Cl.
CPC .............. *B44D 3/22* (2013.01); *B05C 21/005* (2013.01)

(58) Field of Classification Search
None
See application file for complete search history.

(56) References Cited

U.S. PATENT DOCUMENTS 2,840,039 A * 6/1958 Darnell ................... B05B 12/20 118/505
2,925,064 A * 2/1960 Kahn ...................... B05B 12/20 239/150
3,736,904 A * 6/1973 Kus ......................... E04G 21/30 118/505
3,752,304 A * 8/1973 Alef ........................ B05B 12/24 428/80
4,033,803 A * 7/1977 Coder ...................... B05D 1/32 427/282
4,195,590 A * 4/1980 Herrington ......... E05D 11/0054 118/301
4,263,355 A * 4/1981 Sarkisian ................ B05B 12/24 428/156
4,327,663 A * 5/1982 Izzo ........................ B05B 12/20 15/257.01
4,550,683 A * 11/1985 Jones ...................... B05B 12/24 428/137
4,656,058 A * 4/1987 Stark ........................ B05D 1/32 118/504
4,695,486 A * 9/1987 Stark ....................... B05B 12/20 427/282
4,789,579 A * 12/1988 Tutas ...................... B05B 12/24 428/80
4,921,028 A * 5/1990 Schwartz ................ B05B 12/24 16/DIG. 30
5,003,128 A * 3/1991 Grondin .................. B05B 12/20 174/67
5,063,872 A * 11/1991 Maus ...................... B05B 12/20 118/301
5,285,014 A * 2/1994 Gilchrist .............. H01R 13/443 174/67
5,489,459 A * 2/1996 Nauman .................. B44D 3/00 206/820

(Continued)

*Primary Examiner* — Jethro M. Pence
(74) *Attorney, Agent, or Firm* — Fraline J. Allgaier

(57) ABSTRACT

An improved sectionable painter's cup for protecting an object while painting is presented. The sectionable painter's cup features a main body constructed of a non-absorbent collapsible material for blocking liquid from contact with an object while the object is being painted. Cooperating closing members on the collapsible material are formed in a cup-like formation for enclosing the object. The painter's cup are provided in a rolled up configuration and are removable from each other at a tearable strip extending along the sides of each painter's cup.

4 Claims, 7 Drawing Sheets

(56) References Cited

U.S. PATENT DOCUMENTS

| | | | | | |
|---|---|---|---|---|---|
| 5,631,055 | A * | 5/1997 | Vines | B05B 12/24 | 428/354 |
| 5,800,894 | A * | 9/1998 | Navis | B65H 35/004 | 52/211 |
| 5,935,669 | A * | 8/1999 | Leeuwenburgh | B44D 3/00 | 428/40.1 |
| 6,143,392 | A * | 11/2000 | Hughes | B05B 12/24 | 118/505 |
| 6,248,173 | B1 * | 6/2001 | Dixon | B05B 12/24 | 118/301 |
| 6,579,587 | B2 * | 6/2003 | Schnoebelen, Jr. | B32B 1/00 | 428/80 |
| 7,029,535 | B1 * | 4/2006 | Bechtold, Jr. | B05B 12/24 | 118/504 |
| 7,077,909 | B1 * | 7/2006 | Crane | B05B 12/24 | 118/503 |
| 7,291,228 | B2 * | 11/2007 | Gathright | B05B 12/28 | 118/504 |
| 7,422,785 | B2 * | 9/2008 | Ogawa | B05B 12/26 | 428/140 |
| 7,622,003 | B1 * | 11/2009 | Heysek | B44D 3/225 | 15/236.01 |
| 7,638,015 | B2 * | 12/2009 | Schnoebelen, Jr. | B32B 7/12 | 156/60 |
| 8,833,295 | B2 * | 9/2014 | Scholz | B05B 12/24 | 428/192 |
| 8,834,054 | B2 * | 9/2014 | Gallardo | A46B 9/10 | 401/185 |
| 9,061,305 | B1 * | 6/2015 | Martinez | B05B 12/20 | |
| 9,352,349 | B2 * | 5/2016 | Mikesell, Sr. | B05C 21/005 | |
| 9,539,601 | B2 * | 1/2017 | Ruha | B05B 12/28 | |
| 9,623,438 | B2 * | 4/2017 | Moore | B05C 21/005 | |
| 9,956,568 | B2 * | 5/2018 | O'Brien | B05C 21/005 | |
| 9,956,571 | B2 * | 5/2018 | Tatia | B05B 12/20 | |
| 9,956,581 | B2 * | 5/2018 | Moore | B05B 12/20 | |
| 10,625,290 | B2 * | 4/2020 | Brown | B05B 12/24 | |
| 10,857,559 | B2 * | 12/2020 | Masalosalo | B05C 21/005 | |
| 11,400,475 | B1 * | 8/2022 | Spigener | F04D 29/703 | |
| 11,458,495 | B2 * | 10/2022 | Ranweiler | B05B 12/32 | |
| 11,458,496 | B2 * | 10/2022 | Audell | E04G 21/30 | |
| 11,634,918 | B1 * | 4/2023 | McQuade | B05B 12/22 | 5/420 |
| 11,745,203 | B2 * | 9/2023 | Cavaness | B05C 21/005 | 118/504 |
| 12,048,939 | B1 * | 7/2024 | Rojas | B05C 21/005 | |
| 2006/0107896 | A1 * | 5/2006 | Buckingham | B05B 12/30 | 118/504 |
| 2008/0092811 | A1 * | 4/2008 | Kim | B05C 21/005 | 118/504 |
| 2009/0133621 | A1 * | 5/2009 | Schnoebelen, Jr. | B32B 7/12 | 118/505 |
| 2012/0231167 | A1 * | 9/2012 | Langeman | C09J 7/29 | 156/60 |
| 2014/0069333 | A1 * | 3/2014 | Van'T Hof | B05C 21/005 | 118/505 |
| 2014/0366799 | A1 * | 12/2014 | Vulpitta | C09J 7/20 | 156/247 |
| 2015/0151326 | A1 * | 6/2015 | Tatia | B05B 12/28 | 118/505 |
| 2015/0306621 | A1 * | 10/2015 | Chan | B05B 12/26 | 118/505 |
| 2016/0184856 | A1 * | 6/2016 | Westfall | B05C 17/06 | 118/505 |
| 2019/0070624 | A1 * | 3/2019 | Holt | B05B 12/20 | |
| 2023/0415187 | A1 * | 12/2023 | Cavaness | B05B 12/32 | |

* cited by examiner

SECTIONABLE PAINTER'S CUP

RELATED APPLICATIONS

This application claims priority of U.S. Provisional Patent Application Ser. No. 63/626,628 filed Jan. 30, 2024.

FIELD OF THE INVENTION

The present invention refers to sectionable painter's devices and more particularly to an improved sectional painter's cup, which in its preferred embodiment is a main body being constructed of a non-absorbent collapsible material for blocking paint and similar liquids from contact with an object.

BACKGROUND OF THE INVENTION

In the realm of painting and finishing, achieving a clean and professional look is paramount for both amateur and professional painters. The goal of painters is to protect the surfaces of objects from unwanted paint splatters, drips, and debris while ensuring that the final finish is smooth and pristine. Traditional methods of covering fixtures, such as using plastic sheets, tape, and cloths, present numerous disadvantages that can compromise the quality of the work.

Current covers to prevent objects while painting often fail to provide a secure fit, leading to gaps through which paint can seep, resulting in unsightly markings and increased cleanup time. Additionally, these covers can be cumbersome to handle, difficult to adjust, and may not conform well to the shapes of various objects. As a result, painters frequently struggle with the inefficiencies of existing solutions, which can detract from the overall quality and aesthetics of their projects.

The present invention addresses these shortcomings by introducing an innovative solution: sectionable painter's cups designed specifically for protecting objects while painting. Each painter's cup features a main body constructed of a non-absorbent collapsible material that effectively blocks liquid from coming into contact with the surface of the object. This design not only minimizes the risk of paint splatter but also allows for a clean, finished look upon completion of the painting process.

A significant advantage of this invention is its versatile design, which includes a flexible pocket that allows the painter's cup to conform to the shape of the object it covers. The unique closing members on the first and second surfaces ensure a tight seal, preventing any paint from leaking through. Moreover, the vertical perforations along the sides of the cups allow for easy separation and customization of coverage, enabling painters to adapt the product to fit various fixtures without hassle.

In summary, the sectionable painter's cups provide an effective, efficient, and user-friendly solution for painters seeking to achieve a clean and professional finish. By addressing the limitations of current object covers, this invention not only enhances the painting experience but also supports painters in their quest for excellence in their craft.

SUMMARY

This disclosure presents an innovative solution for protecting objects during the painting process through the introduction of sectionable painter's cups. Each painter's cup comprises a main body constructed from a non-absorbent collapsible material, designed to effectively block liquid paint from contacting the object. The cups feature a unique design with a first surface that includes closing members, which securely attach to a cooperating member on the second surface, ensuring an airtight fit around the object. This disclosure also incorporates a flexible object-facing pocket that allows the cup to conform to various shapes, enhancing its usability across different fixtures. Vertical perforations along the sides of the cups create tearable strips, enabling easy customization and separation of the painter's cups, which are provided in a rolled-up configuration. This design not only facilitates quick application but also promotes a clean and professional finish by preventing paint splatters and drips.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

Additional advantages and features of the present invention will become more apparent when considered in light of the following specification and drawings.

BRIEF DESCRIPTION OF THE DRAWINGS

The present embodiments are illustrated by way of the figures of the accompanying drawings, which may not necessarily be to scale, in which like references indicate similar elements, and in which.

DETAILED DESCRIPTION

Figure 1:
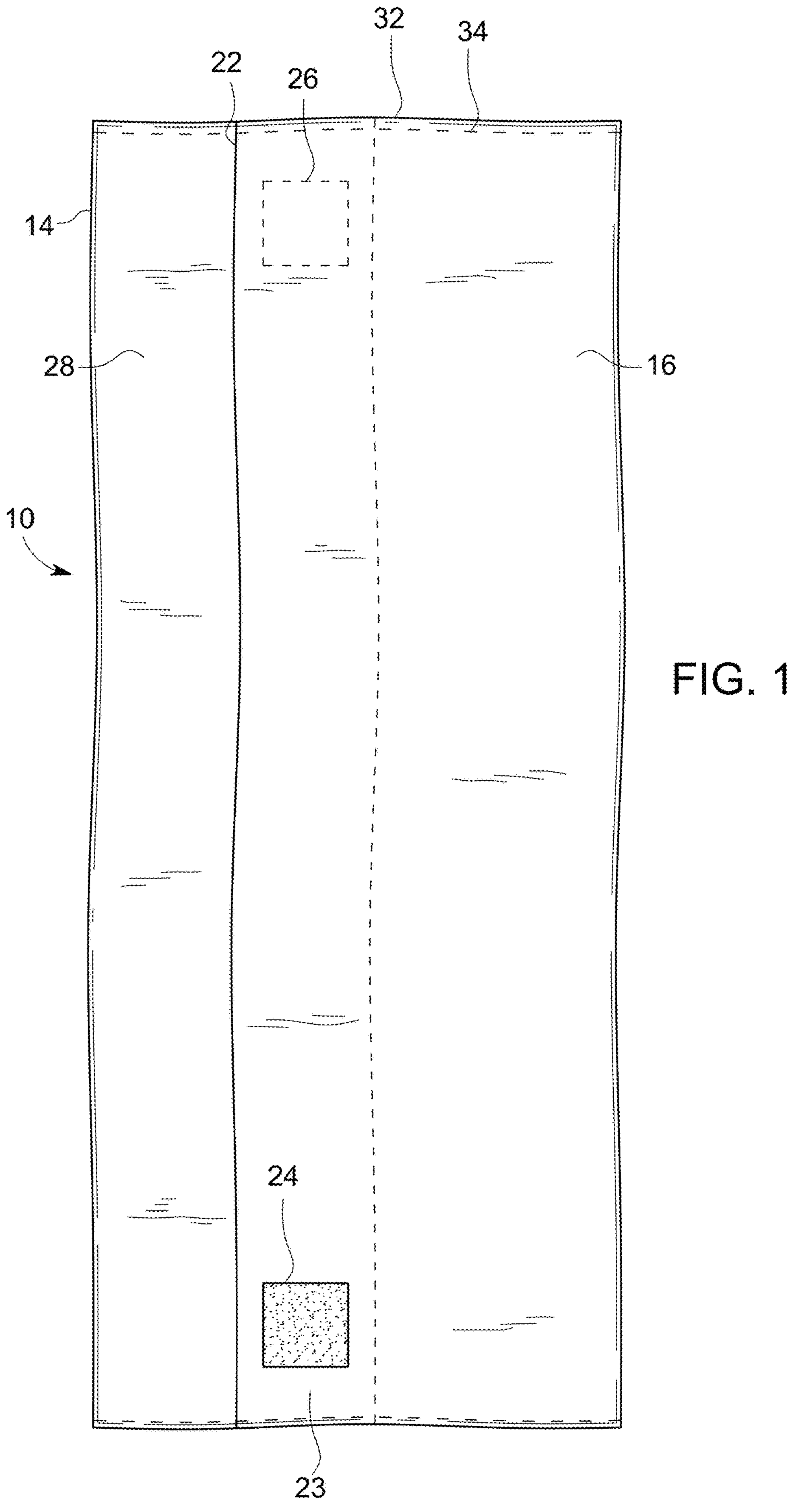
FIG. 1 is a diagrammatic, enlarged view of a sectionable painter's cup embodying the present invention.
Figure 2:
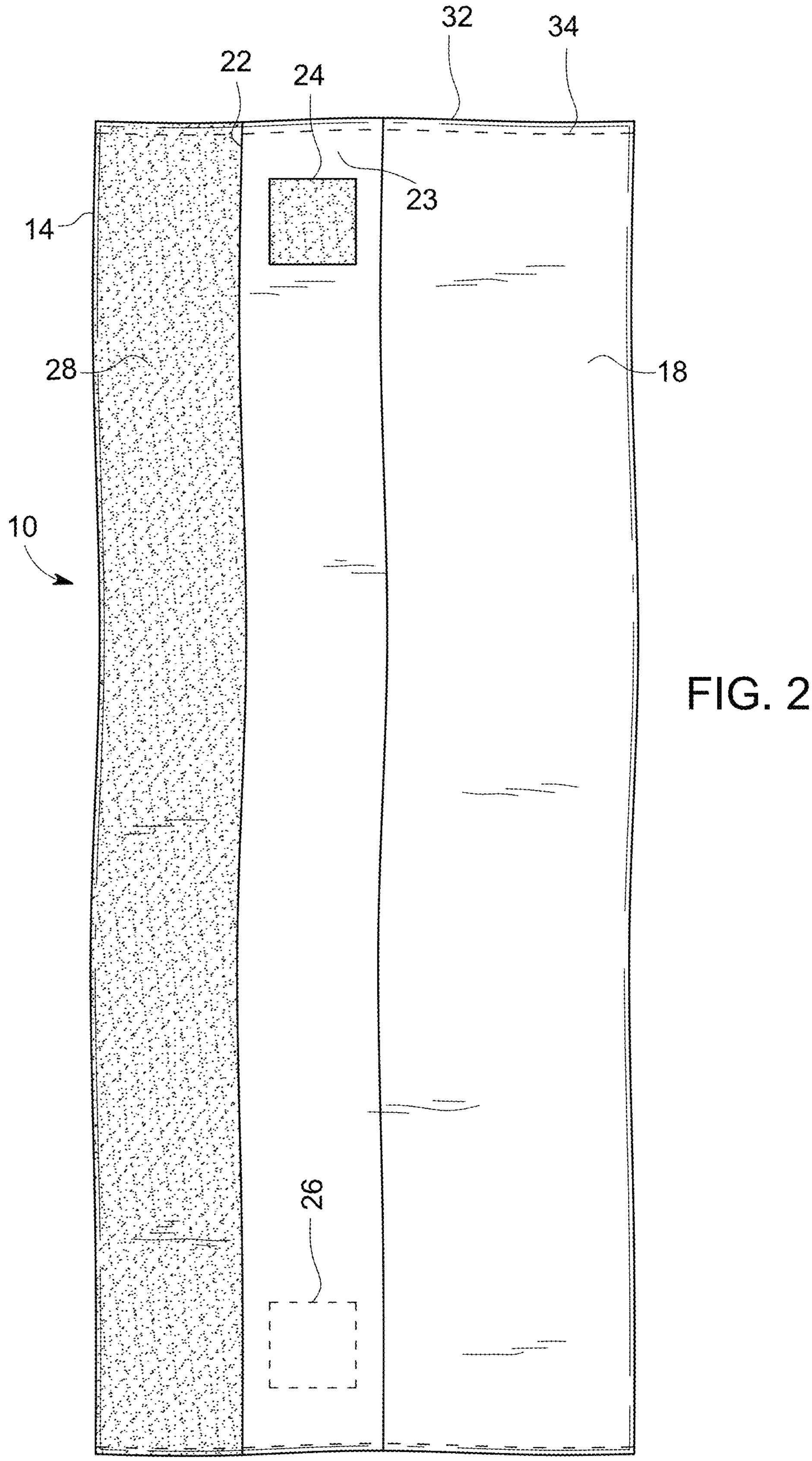
FIG. 2 is a perspective view thereof showing a second surface.
Figure 3:
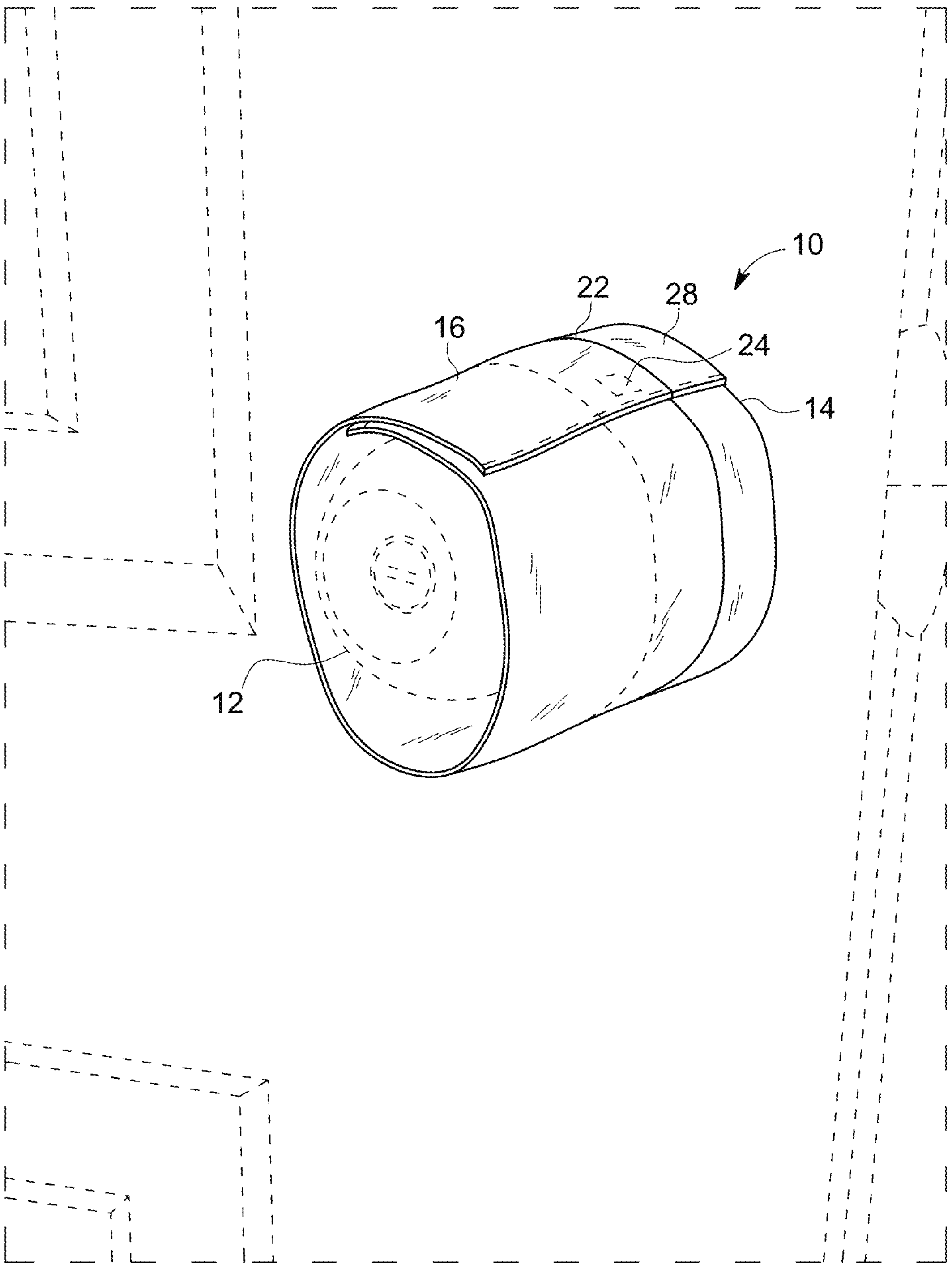
FIG. 3 is a perspective view thereof in which a sectionable painter's cup is used to cover an object.
Figure 4:
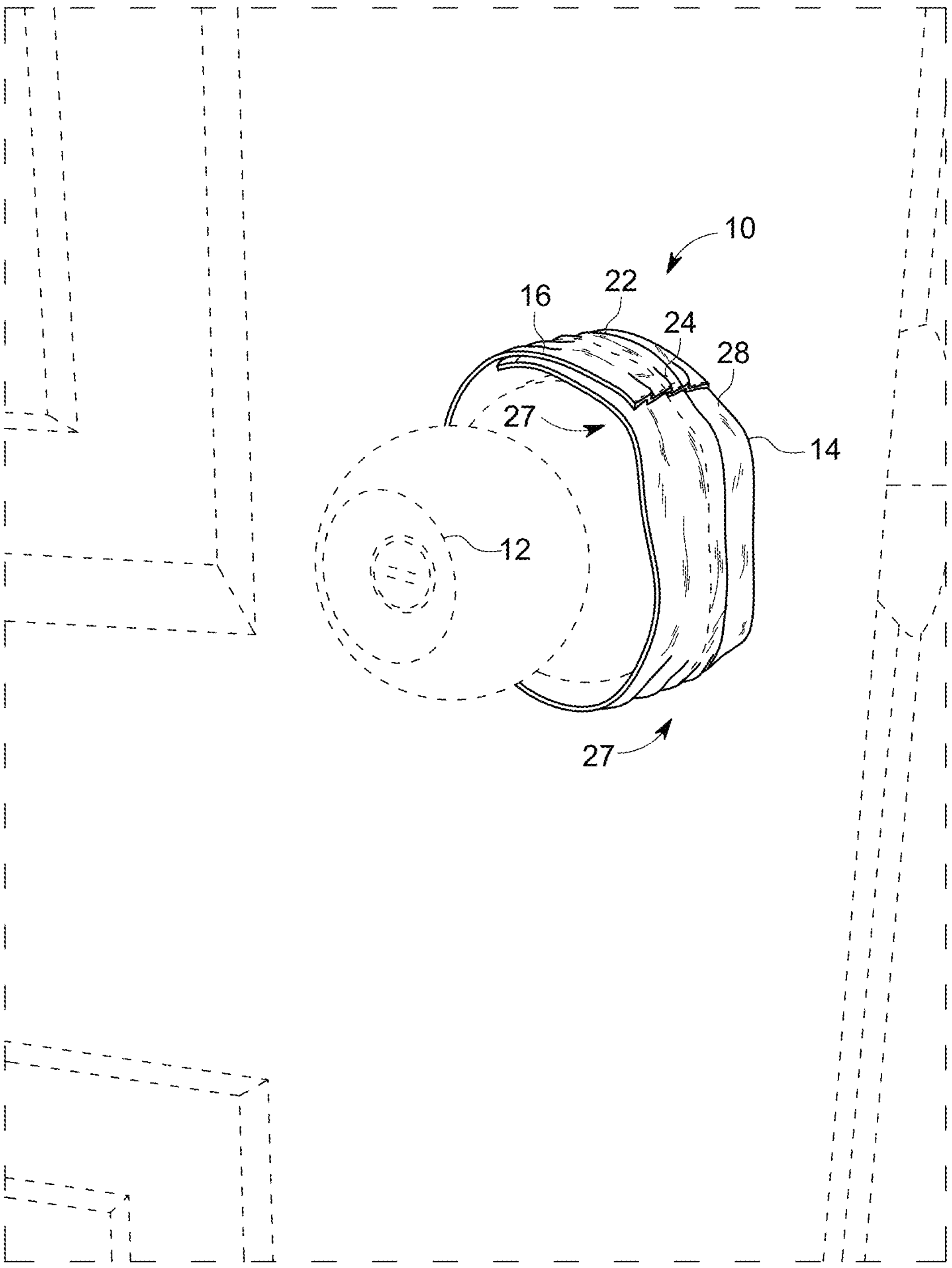
FIG. 4 is a perspective view thereof in which a sectionable painter's cup is shown in a collapsed position.
Figure 5:
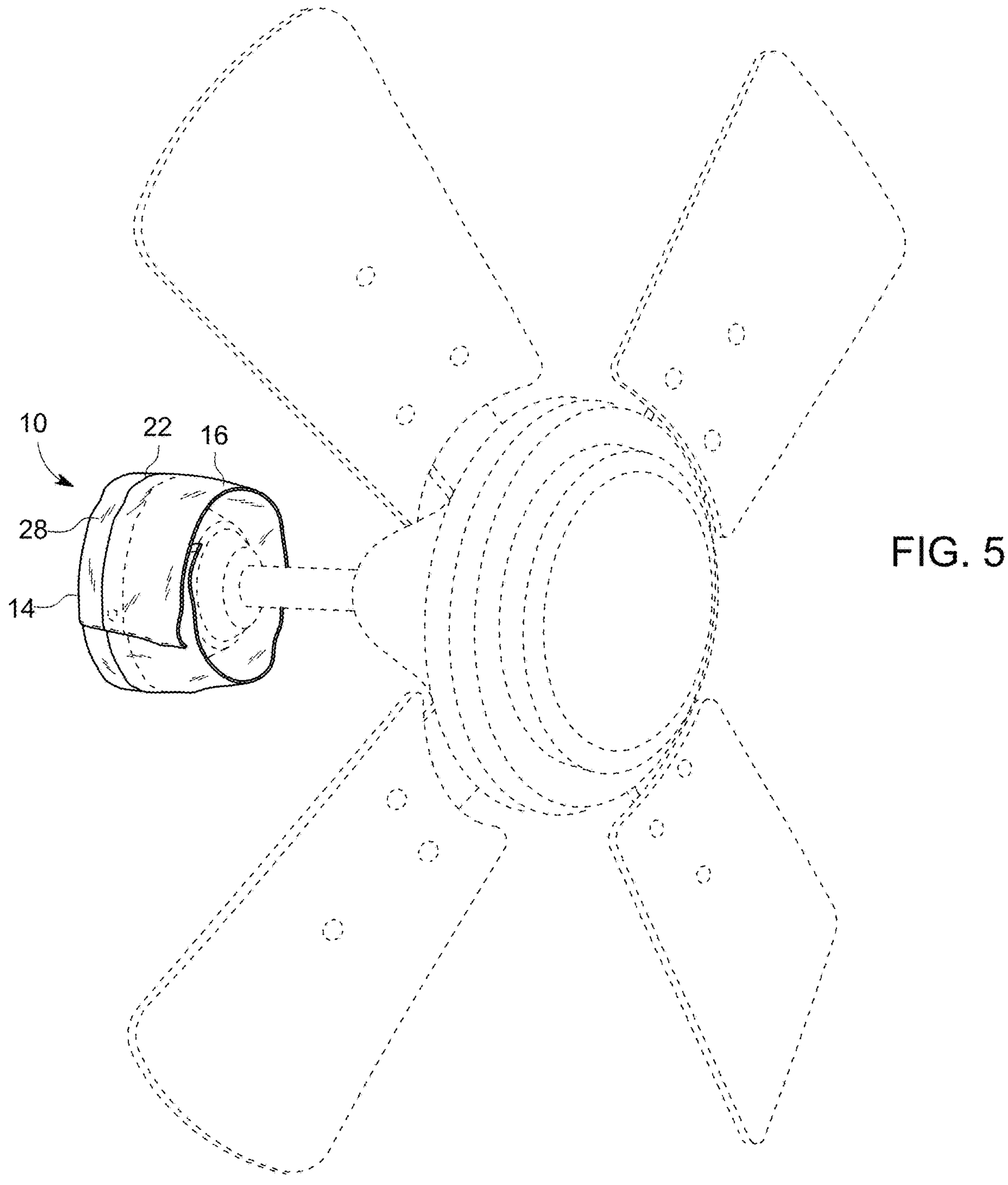
FIG. 5 is yet another perspective view thereof in which a sectionable painter's cup is used to cover an object.

The following detailed description is a contemplated mode of carrying out a sectionable painter's cup 10 and method of manufacture described herein. Although the sectionable painter's cup 10 and method of manufacture are explained in relation to an illustrated embodiment, it is understood that many possible modifications and variations can be made without departing from the spirit and scope of the disclosure.

Therefore, sectionable painter's cups 10 are designed for use in a variety of painting settings, making them versatile tools for both professional and amateur painters. These painter's cups 10 can be utilized in residential environments for home improvement projects, commercial settings for professional painting jobs, and even in workshops where artisans and craftspeople require reliable surface protection while engaging in their creative processes. The design of the painter's cups 10 accommodates a range of objects 12, including furniture, decorative items, and rectangular items such as electrical outlets, alarm sensors, electrical boxes, and the same to ensure that the painter's cup 10 as provided herein can be effectively employed in diverse applications.

It can be appreciated that the implementation of a painter's cup 10 as provided herein can include the use of various types of liquids such as paints, stains, powdered colorants, liquid colorants, or other coating compositions. The intended users of the sectionable painter's cups 10 include homeowners looking to undertake DIY projects, professional painters seeking efficient ways to protect surfaces, and artisans who require the ability to cover intricate objects 12 while working on detailed finishes. The user-friendly design allows individuals of all skill levels to easily apply and adjust the cups 10 as needed.

The arrangement of the painter's cups 10 can be modified based on the specific needs of the project. Users can separate the cups 10 along the vertical perforations to create customized coverage for different-sized objects 12, allowing for flexibility in application. This modular design not only enhances usability but also optimizes storage, as the cups 10 can be rolled up and stored compactly when not in use.

It will be understood that the inventor's idea of the roll is that the painter's cup could be used as a standard size of 10"×2.5" or produced where the adjacent tear cuts of the painter's cup could be sized for specific objects. The painter's cup should be easily severed into such lengths and widths as desired by a manufacturer or user and wherein the tear cuts could be produced as single slits.

The disclosure as provided herein can include the option to provide the sectionable painter's cups 10 as single strips, accommodating users who may require only a smaller supply of cups 10 for a particular task. This promotes efficiency by reducing the number of cups 10 and ensures that the end users can maintain flexibility in their application needs.

For construction, the main body 14 of the painter's cups 10 are made from a non-absorbent collapsible material such as tarp, vinyl, plastic, synthetic paper, or similar polymers, which provide durability while preventing paint from seeping through. The flexible pocket 28 on the object-facing side may be constructed from flexible materials such as silicone. Additional stretchable fabric, such as nylon or polyester, which enables it to conform to various shapes and sizes of objects 12 may be used to attach the pocket 28 to an object 12. The closing members 24 on both surfaces 16,18 can be made from Velcro, hook-and-loop fasteners or snap-fit mechanisms, ensuring a secure and reliable seal around the object 12.

The design of the painter's cups 10 emphasizes convenience and efficiency, allowing for quick application and removal without compromising the quality of the finished work. The materials selected for each component of the cups 10 are chosen for their ability to withstand the rigors of the painting process, including exposure to various types of paint and solvents. Additionally, the collapsible nature of the cups 10 ensures that they can be easily stored and transported, making them a practical choice for painters on the go.

Overall, the inventor is suggesting the sectionable painter's cup 10 because it would fulfill the need for an effective and adaptable solution for protecting surfaces during painting tasks. Their unique features, including customizable coverage, secure sealing mechanisms, and user-friendly designs, make them an essential tool for anyone aiming to achieve a clean, professional finish. The potential exists for further customization and variation in the production of these cups 10, allowing for different sizes, colors, and materials to appeal to a broader range of users in the painting industry.

For example, and without limitation, FIGS. 1-7 show the sectional painter's cup 10 according to one embodiment of the present disclosure wherein the sectional painter's cups 10 protect an object 12 while painting. Each painter's cup 10 comprising a main body 14 having a first surface 16 and a second surface 18.

The first surface 16 and the second surface 18 being constructed of a non-absorbent collapsible material for blocking liquid from contact with the object 12 and a bottom portion 22 having inner-marginal positions 23 and wherein the inner-marginal position 23 of the first surface 16 is provided with a closing member 24 that attach to a cooperating closing member 26 on the bottom portion 22 of the second surface 18. The non-absorbent collapsible layer being in a collapsed state when compressed in a downward position 27 from the object 12.

The second surface 18 is attached to an object-facing pocket 28 containing a flexible material allowing for the cup-like formation of the painter's cup 10 and for attachment to the object 12. The closing members 24 of the first surface 16 and the cooperating closing member 26 on the second surface 18 are formed in such a manner that they are located on a linear plane and are depressed toward one another in face-to face relation to cover the object 12.

The main body 14 having sides with vertical perforations providing joining areas between each side of the painter's cup 10 extending vertically along the sides to define a segment of each painter's cup 10 for covering the object 12. Each painter's cup 10 is provided in a rolled up configuration and arranged in a uniformly spaced parallel relationship and is removable from each other at the perforation and wherein the perforations form a tearable strip extending along the sides of each painter's cup 10.

Use of the present invention is shown on objects 12 in FIGS. 3-6, wherein as an alternative embodiment, the painter's cups 10 are used on objects 12 as provided herein and an adhesive surface 42 such as double-sided painter's tape is first applied immediately near the surface being painted and attached to the lower peripheral edge of a painter's cup 10. In some applications, the required amount of the adhesive surface 42 is first torn off and the adhesive surface 42 is masked around the object 12 and along the edges to be painted. Using the adhesive surface 42 in a parallel configuration with the painter's cup 10 prevents any seepage while painting or any related application that would require protection for an object 12. In this scenario, any paint that seeps over the guide edge of the adhesive surface 42 is absorbed therein and the adhesive surface 42 is removed and discarded once the paint has dried.

Figure 6:
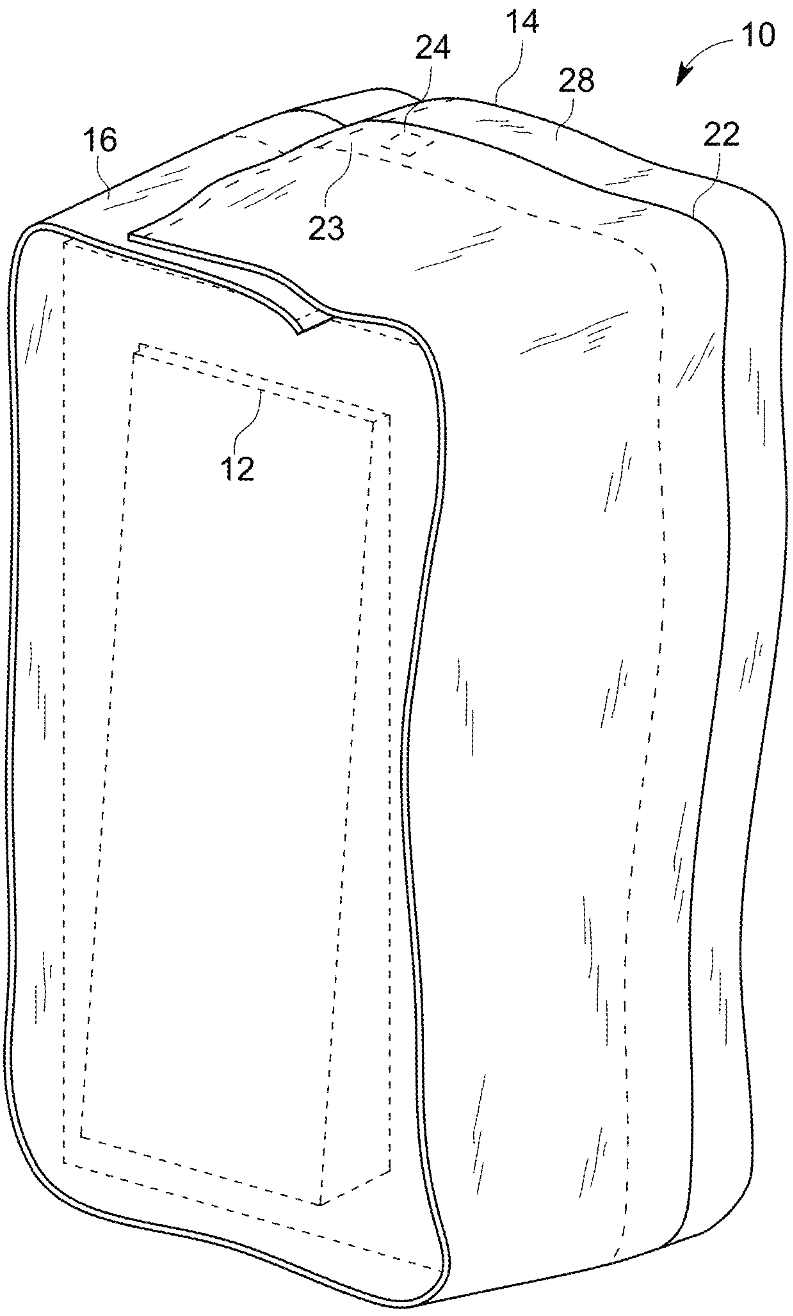
FIG. 6 illustrates an embodiment of the sectionable painter's cup showing a Velcro strap that is fixed in position thereon.
Figure 7:
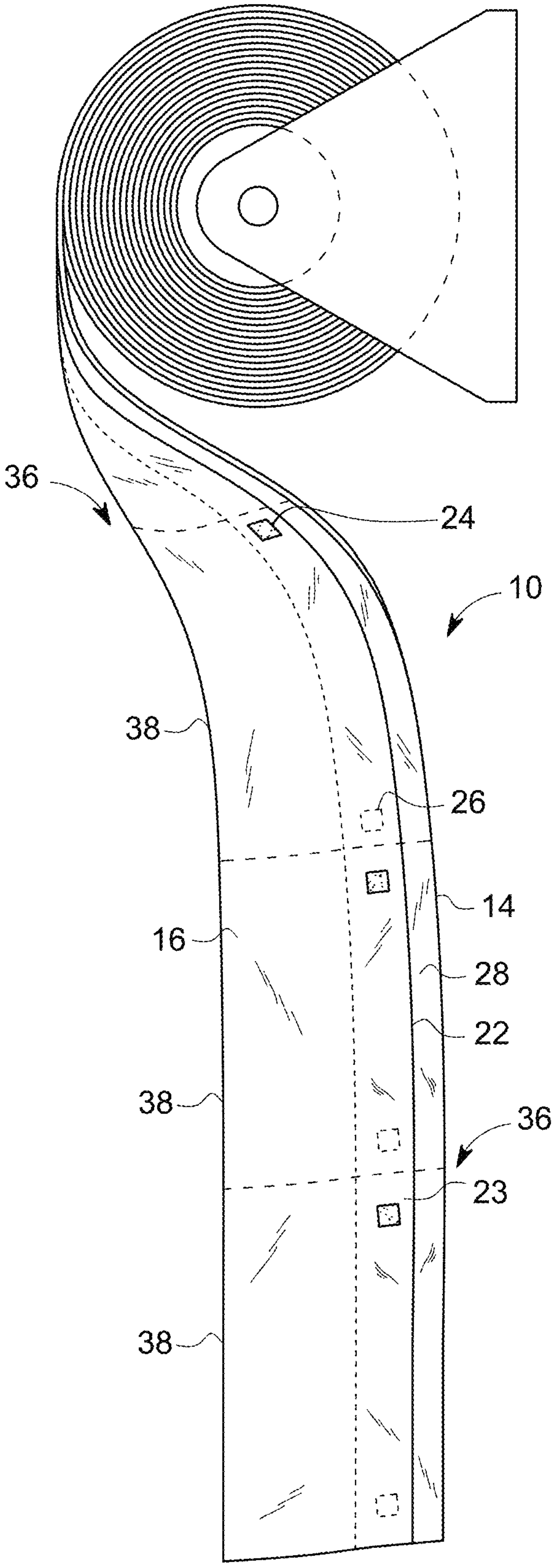
FIG. 7 is a perspective view thereof in which the sectionable painter's cups are shown in a rolled configuration.

The painter's cup 10 is arranged at the top or surrounding the device. It offers protection by being sleeved over the object 12 to provide protection against liquids such as paints and accidental drops of liquid associated with painting. It will be understood that the object-facing pocket 28 of the painter's cup 10 allows the cup 10 to be properly secured, adjusted, and removed from the object 12. This provides further protection as an overhang or a grip surface that minimizes the possibility of the user gripping all part of an object 12, damaging, or accidentally removing it. The cup 10 being secured to objects 12 in positions extending generally vertically from one surface of the base to which they are secured and can be wound on itself, such that the closing members 24, 26 may overlap and can be released by loosening the grip of the flexible materials in the pocket 28. As shown in FIG. 6, the closing members 24, 26 can be a Velcro strap that is fixed in position with a single loop sewn into two portions of the pocket 28 so that the cup 10 can be secured in an overlapped position during use or can be easily positioned out of the way.

Having described my invention, however, many modifications thereto will become apparent to those skilled in the art to which it pertains without deviation from the spirit of the invention as defined by the scope of the appended claims. Although the invention has been explained in relation to its preferred embodiment, it is to be understood that many other possible modifications and variations can be made without departing from the spirit and scope of the invention.

What is claimed is:

1. Sectionable painter's cups for protecting an object while painting, each of the painter's cups comprising:

a main body having a first surface and a second surface;

the first surface and the second surface being constructed of a non-absorbent collapsible material for blocking liquid from contact with the object and a bottom portion having inner-marginal positions and wherein an inner-marginal position of the first surface is provided with a closing member that attach to a cooperating closing member on the bottom portion of the second surface and the non-absorbent collapsible layer being in a collapsed state when compressed in a downward position from the object;

the second surface being attached to an object-facing pocket containing a flexible material allowing for a cup formation of each of the painter's cups and for attachment to the object;

wherein the closing member of the first surface and the cooperating closing member on the second surface are formed in such a manner that they are located on a linear plane and are depressed toward one another in face-to face relation to cover the object;

the main body having sides with vertical perforations providing joining areas between each of the sides of each of the painter's cups extending vertically along the sides to define a segment of each of the painter's cups for covering the object;

wherein each of the painter's cups is provided in a rolled up configuration and arranged in a uniformly spaced parallel relationship and is removable from each other at the perforations and wherein the perforations form a tearable strip extending along the sides of each of the painter's cups.

2. The sectionable painter's cups of claim 1, wherein the object-facing pocket of each of the painter's cups allows each of the painter's cups to be adjusted on the object.

3. The sectionable painter's cups of claim 1, wherein the object-facing pocket of each of the painter's cups allows each of the painter's cups to be removed from the object.

4. Sectionable painter's cups for protecting an object while painting, each of the painter's cups comprising:

a main body having a first surface and a second surface;

the first surface and the second surface being constructed of a non-absorbent collapsible material for blocking liquid from contact with the object and bottom portions having inner-marginal positions and wherein an inner-marginal position of the first surface is provided with a closing member that attach to a cooperating closing member on the bottom portion of the second surface and the non-absorbent collapsible layer being in a collapsed state when compressed in a downward position from the object;

the second surface being attached to an object-facing pocket containing a flexible material allowing for a cup formation of each of the painter's cups and for attachment to the object;

wherein the closing members of the first surface and the cooperating closing member on the second surface are formed in such a manner that they are located on a linear plane and are depressed toward one another in face-to face relation to cover the object;

the main body having sides with vertical perforations providing joining areas between each of the sides of each of the painter's cups extending vertically along the sides to define a segment of each of the painter's cups for covering the object;

wherein each of the painter's cups is provided in a rolled up configuration and arranged in a uniformly spaced parallel relationship and is removable from each other at the perforations and wherein the perforations form a tearable strip extending along the sides of each of the painter's cups;

wherein a lower peripheral edge being adapted to receive an adhesive surface thereon for placement of each of the painter's cups thereon.

* * * * *